(12) United States Patent
Rugge et al.

(10) Patent No.: US 9,568,209 B2
(45) Date of Patent: Feb. 14, 2017

(54) SYSTEM AND METHOD FOR CONTROLLING OUTPUT FLOW OF PARALLEL CONNECTED BLOWERS

(71) Applicant: Eaton Corporation, Cleveland, OH (US)

(72) Inventors: Ravishankar Shivsharan Rugge, Maharashtra (IN); Huaqiang Li, Menomonee Falls, WI (US); Robert Fenton, Menomonee Falls, WI (US)

(73) Assignee: Eaton Corporation, Cleveland, OH (US)

( * ) Notice: Subject to any disclaimer, the term of this patent is extended or adjusted under 35 U.S.C. 154(b) by 872 days.

(21) Appl. No.: 13/873,716

(22) Filed: Apr. 30, 2013

(65) Prior Publication Data

US 2014/0323030 A1    Oct. 30, 2014

(51) Int. Cl.
*F24F 11/04*    (2006.01)
*F24F 11/00*    (2006.01)

(52) U.S. Cl.
CPC ............ *F24F 11/04* (2013.01); *F24F 11/0079* (2013.01); *F24F 2011/0042* (2013.01);
(Continued)

(58) Field of Classification Search
CPC ................. F24F 2001/0047; F24F 2011/0042; F24F 2011/0075; F24F 11/0079; F24F 11/04; Y02B 30/746
(Continued)

(56) References Cited

U.S. PATENT DOCUMENTS

| | | | |
|---|---|---|---|
| 5,269,660 | A | 12/1993 | Pradelle |
| 6,537,019 | B1 | 3/2003 | Dent |
| 6,719,625 | B2 | 4/2004 | Federspiel |
| 6,735,499 | B2 | 5/2004 | Ohki et al. |
| 6,748,162 | B2 | 6/2004 | Poutot et al. |

(Continued)

FOREIGN PATENT DOCUMENTS

| | | |
|---|---|---|
| CA | 2781853 A1 | 10/2004 |
| CN | 102562639 A | 7/2012 |

(Continued)

OTHER PUBLICATIONS

PCT International Search Report and Written Opinion from corresponding PCT/US2014/034882, Jul. 18, 2014.

(Continued)

*Primary Examiner* — Gregory Huson
*Assistant Examiner* — Dana Tighe
(74) *Attorney, Agent, or Firm* — Ziolkowski Patent Solutions Group, SC

(57) ABSTRACT

A ventilation system includes first and second blowers connected to a plenum in parallel, with a first motor drive to control a speed of an electric motor of the first blower and a second motor drive to control a speed of an electric motor of the second blower. A controller associated with the first blower is programmed to receive a set point for a controlled variable that is controllable by operation of the first and second blowers, estimate a total air flow required from the first and second blowers to reach the controlled variable set point, calculate a blower speed ratio between a first blower speed and a second blower speed that provides the required total air flow at a minimum power consumption level, and generate commands to cause the first blower and the second blower to operate at speeds resulting in the calculated blower speed ratio.

20 Claims, 6 Drawing Sheets

(52) U.S. Cl.
CPC ............... *F24F 2011/0047* (2013.01); *F24F 2011/0075* (2013.01); *Y02B 30/746* (2013.01)

(58) Field of Classification Search
USPC ........................................ 454/229, 239, 256
See application file for complete search history.

(56) References Cited

U.S. PATENT DOCUMENTS

| | | | |
|---|---|---|---|
| 6,781,258 B2 | 8/2004 | Hashimoto | |
| 6,881,142 B1* | 4/2005 | Nair | F24F 11/0001 236/49.3 |
| 7,054,721 B2 | 5/2006 | Malone et al. | |
| 7,156,611 B2 | 1/2007 | Oosawa et al. | |
| 8,179,071 B2 | 5/2012 | Phelan et al. | |
| 2002/0155804 A1 | 10/2002 | Poutot et al. | |
| 2006/0112702 A1 | 6/2006 | Martin et al. | |
| 2007/0076372 A1 | 4/2007 | Lin | |
| 2008/0283033 A1* | 11/2008 | Michaud | F24H 9/2071 126/110 A |
| 2010/0076606 A1 | 3/2010 | Gatley et al. | |
| 2010/0094434 A1 | 4/2010 | Ballet et al. | |
| 2010/0260616 A1 | 10/2010 | Osawa et al. | |
| 2012/0257957 A1 | 10/2012 | Yanagisawa et al. | |

FOREIGN PATENT DOCUMENTS

| | | |
|---|---|---|
| EP | 0636846 A1 | 2/1995 |
| JP | 2238195 A | 9/1990 |
| WO | 2010048730 A2 | 5/2010 |
| WO | 2013038470 A1 | 3/2013 |

OTHER PUBLICATIONS

Vakiloroaya et al., "Energy-efficient HVAC systems: Simulation-empirical modelling and gradient optimization," Elsevier, Automation in Construction, vol. 31, 2013, pp. 176-185.

Bandara et al., "Energy saving by controlling the inlet air flow of a oil fired boiler using a VSD driven blower fan—Case Study," TENCON 2008, 2008 IEEE Region 10 Conference, Nov. 19-21, 2008, pp. 1-5.

Sorensen et al., "An Energy Efficient Control Strategy for Fan Static Pressure Difference," Consumer Electronics, Communications and Networks (CECNet), 2011 International Conference, Apr. 16-18, 2011, pp. 4736-4739.

Rhew et al., "Efficiency Optimal Operating for Vane-Speed Parallel Flow Control System," TENCON '89, Fourth IEEE Region 10 International Conference, Nov. 22-24, 1989, pp. 1007-1010.

Engdahl et al., "Pressure controlled variable air volume system," Elsevier, Energy and Buildings, vol. 35, Dec. 2003, pp. 1161-1172.

Tamminen et al., "Sensorless Flow Rate Estimation in Frequency-Converter-Driven Fans," Power Electronics and Applications (EPE 2011), Proceedings of the 2011—14th European Conference, Aug. 30, 2011-Sep. 1, 2011, pp. 1-10.

Mahdavian et al., "An Energy Efficient Approach for Flow Control of Parallel Blowers," Environmental and Electrical Engineering (EEEIC), 2012—11th International Conference, May 18-25, 2012, pp. 134-139.

Fulai et al., "Optimal Switch in Variable-speed Fan Stations," Materials for Renewable Energy & Environment (ICMREE), 2011 International Conference, May 20-22, 2011, pp. 1318-1321.

* cited by examiner

SYSTEM AND METHOD FOR CONTROLLING OUTPUT FLOW OF PARALLEL CONNECTED BLOWERS

BACKGROUND OF THE INVENTION

The present invention relates generally to heating, ventilation and air conditioning (HVAC) systems and, more particularly, to a system and method for controlling the output flow of parallel connected blowers to maximize efficiency thereof.

Heating, ventilation, and air conditioning (HVAC) is the technology of indoor and automotive environmental comfort. In HVAC systems, fans and blowers are used to move air and are an integral part of the air handling systems that bring or draw fresh air into buildings. HVAC fans and blowers can be mounted to an exterior wall (ventilation unit) or above the ceiling (plenum fan), or used as part of a ducted system (duct fan). The fan spins or the blower turns by means of an electric motor, thus creating unidirectional air flow. Types of HVAC fans and blowers include vents or ventilation fans, plenum fans, duct fans, duct blowers, roof fans, exhaust fans, inline fans, tube axial fans, vane axial fans, and centrifugal blowers.

According to various system designs, the HVAC fans/blowers can be connected in series or parallel. There are many applications in HVAC design where it is desirable or even necessary to run the fans/blowers in parallel, such as based on space constraints or a desire to provide greater flow, or to provide diversity or standby capability (i.e., backup fan/blower). In some cases, the fans/blowers are identical and in others they may not be identical—primarily because the second fan/blower was added later to increase capacity. The fans/blowers are normally connected to a plenum, with the flow from each fan/blower adding up to meet a specified flow requirement.

In operating the fans/blowers, there are various combinations of speed at which the two fans/blowers can be operated to meet the desired total flow. The combination of speed at which the two fans/blowers are operated dictates, in large part, the overall power consumed in driving the fans/blowers and the efficiency at which the HVAC system is run. As ventilation fans/blowers are, energy-demanding equipment that stand for a significant share of a HVAC system's total energy consumption, the combination of speed at which the two fans/blowers are operated thus is an important factor in improving energy efficiency during system operation and in reducing the total power consumed by the system.

It would therefore be desirable to provide a system and method that enables controlling the output flow of parallel connected fans/blowers to maximize efficiency thereof.

BRIEF DESCRIPTION OF THE INVENTION

Embodiments of the present invention provide a system and method for controlling the output flow of parallel connected blowers to maximize efficiency thereof.

In accordance with one aspect of the invention, a ventilation system includes a plenum, a first blower connected to the plenum to provide a first air flow thereto via operation of an electric motor of the first blower, and a second blower connected to the plenum to provide a second air flow thereto via operation of an electric motor of the second blower, the second blower being connected to the plenum in parallel with the first blower. The ventilation system further includes a first motor drive configured to control a speed of the electric motor of the first blower so as to also control a speed of the first blower, a second motor drive configured to control a speed of the electric motor of the second blower so as to also control a speed of the second blower, and a controller programmed to receive a set point for a controlled variable that is controllable by operation of the first and second blowers, estimate a total air flow required from the first and second blowers to reach the controlled variable set point, calculate a blower speed ratio between a first blower speed and a second blower speed that provides the required total air flow at a minimum power consumption level, and generate commands to cause the first blower and the second blower to operate at speeds resulting in the calculated blower speed ratio.

In accordance with another aspect of the invention, a method for controlling the output flow of parallel connected blowers in a ventilation system includes steps of identifying a set point for a controlled variable in the ventilation system that is controllable by selective operation of a first blower and a second blower in the ventilation system that are connected in parallel to a plenum, estimating a total air flow required from the first and second blowers to reach the controlled variable set point, and calculating a blower speed ratio between a speed of the first blower and a speed of the second blower speed that provides the required total air flow at a minimum power consumption level in the ventilation system. The step of calculating the blower speed ratio further comprises steps of accessing blower performance specifications for each of the first blower and the second blower relating blower operating pressure, blower air flow, blower speed and blower power consumption, mapping for each of the first and second blowers operating pressure and air flow levels to an associated blower speed and blower power consumption based on the blower performance specifications, identifying a ratio of blower speeds for the first blower and the second blower that provides the required total air flow at a minimum power consumption level, and operating the first blower and the second blower according to the calculated blower speed ratio, so as to minimize power consumption.

In accordance with yet another aspect of the invention, a method for controlling the output flow of parallel connected blowers in a ventilation system includes setting a reference set point for a controlled variable in the ventilation system that is controllable by selective operation of a first blower and a second blower in the ventilation system that are connected in parallel to a plenum, estimating a total air flow required from the first and second blowers to reach the controlled variable reference set point, and calculating a blower speed ratio between a speed of the first blower and a speed of the second blower speed that provides the required total air flow at a minimum power consumption level in the ventilation system. The method also includes operating the first blower and the second blower at speeds resulting in the calculated blower speed ratio, receiving feedback on a value of the controlled variable with respect to the controlled variable, re-calculating the blower speed ratio between the speeds of the first and second blowers that provides a required total air flow at a minimum power consumption level, and incrementally ramping the speed ratio to the re-calculated blower speed ratio such that the controlled variable does not deviate from its reference set point.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

The embodiments of the invention set forth herein relate to a system and method for controlling the output flow of parallel connected blowers to maximize efficiency thereof. Embodiments of the invention are directed to HVAC systems encompassing a plurality of structures and control schemes. That is, ventilation systems having blowers of equal or differing sizes and makes/models connected in parallel, as well as controlling of the blowers via either an open or closed loop control scheme, are considered to be within the scope of the invention.

Figure 1:
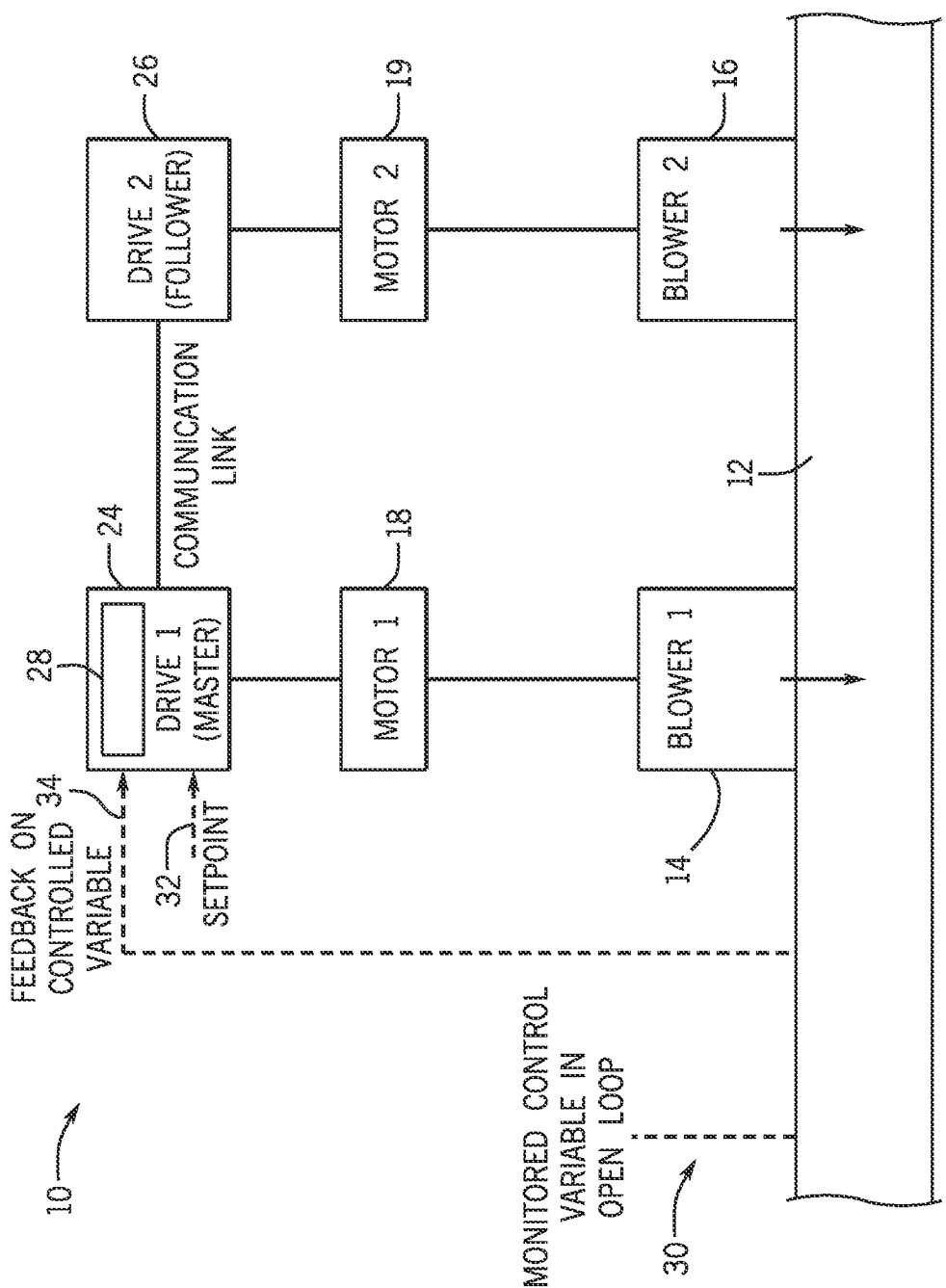
FIG. 1 a schematic of a ventilation system having a pair of blowers connected in parallel to a plenum, according to an embodiment of the invention.

Referring to FIG. 1, a ventilation system 10 that could be used with control schemes of the present invention is shown according to one embodiment. The ventilation system 10 includes a plenum 12 having two blowers 14, 16 (i.e., a first blower 14 and a second blower 16) connected thereto in parallel, with the blowers 14, 16 being of similar size/capacity or differing sizes/capacities and being configured to move/force air through the plenum 12 for purposes of providing ventilation, heating, or cooling according to a desired embodiment. As used herein, the term "blower" is understood to encompass a plurality of different HVAC fans and blowers, including vent or ventilation fans, plenum fans, duct fans, duct blowers, roof fans, exhaust fans, and centrifugal blowers, for example. Thus, the use of the term "blower" hereafter is not meant to limit the scope of the invention to a particular fan or blower construction.

As shown in FIG. 1, each blower 14, 16 is driven by an electric motor 18, 19, respectively, such as an AC induction motor, with the electric motors 18,19 providing power to blowers 14, 16 through a belt (not shown) for example. Blowers 14, 16 spin or turn by means of power provided thereto from the electric motors 18, 19, thus creating unidirectional air flow. The speed of the electric motor 18, 19 in each of blowers 14, 16 is controlled through an associated motor drive—shown as drive 24 and drive 26. The motor drives 24, 26 may be any type of variable speed drive (VSD) of known construction, such as a drive that rectifies an AC power supply into a DC bus voltage and subsequently inverts the DC bus voltage into an AC power of desired frequency and magnitude.

One or more controllers 28 are provided in ventilation system 10 that control operation of motor drives 24, 26 and that, according to one embodiment, receive input regarding various parameters associated with operation of the ventilation system 10. According to an exemplary embodiment, motor drive 24 includes an associated controller 28 that controls operation of motor drive 24 and of motor drive 26. The controller 28 can be integrated with motor drive 24 or can be used as an add-on card. The motor drive 24 is termed as a "master" drive, with motor drive 26 being a "follower" drive, as the controller 28 in motor drive 24 provides feedback and data input to motor drive 26, such as setting a speed reference for the electric motor 19 of blower 16 that is communicated to motor drive 26 for controlling of blower 16. The controller 28 also has a provision to fix/control the speed ratio between the reference speed of blower 14 and blower 16, so any change in reference speed of blower 14 would reflect in blower 16 corresponding to the ratio set between them. Thus, it is recognized that exemplary embodiments of the ventilation system 10 operate without a requirement for programmable logic controllers (PLC) being included therein.

As shown in phantom in FIG. 1, the ventilation system 10 (and more specifically motor drives 24, 26) can be operated via either an open-loop control scheme or a closed-loop control scheme, with the inputs provided to the motor drives 24, 26 varying based on the selected control scheme. According to an open-loop control scheme, a controlled variable is manually set and monitored for the ventilation system, as indicated at 30. According to a closed-loop control scheme, a reference set point for a controlled variable is input to the controller 28 of motor drive 24, as indicated at 32, and feedback is provided on the controlled variable (i.e., a dynamic or periodic reading of the value of the controlled variable) to the controller 28 of motor drive 24, as indicated at 34.

The controller 28 functions to generate commands that control operation of the motor drives 24, 26 by sending speed reference commands thereto. The speed reference commands cause the motor drives 24, 26 to provide regulated power to the blowers 14, 16, respectively, so as to cause the blowers 14, 16 to operate at specified speeds and so as to generate a required air flow for the ventilation system 10, while also minimizing the power consumed by the system in generating the required flow. In controlling the speeds of blowers 14, 16, controller 28 independently sets reference speeds for the blowers 14, 16, and fixes/controls the speed ratio between the reference speeds of blowers 14, 16, with a change in the reference speed for blower 14 being reflected in the reference speed of blower 16.

Figure 2:
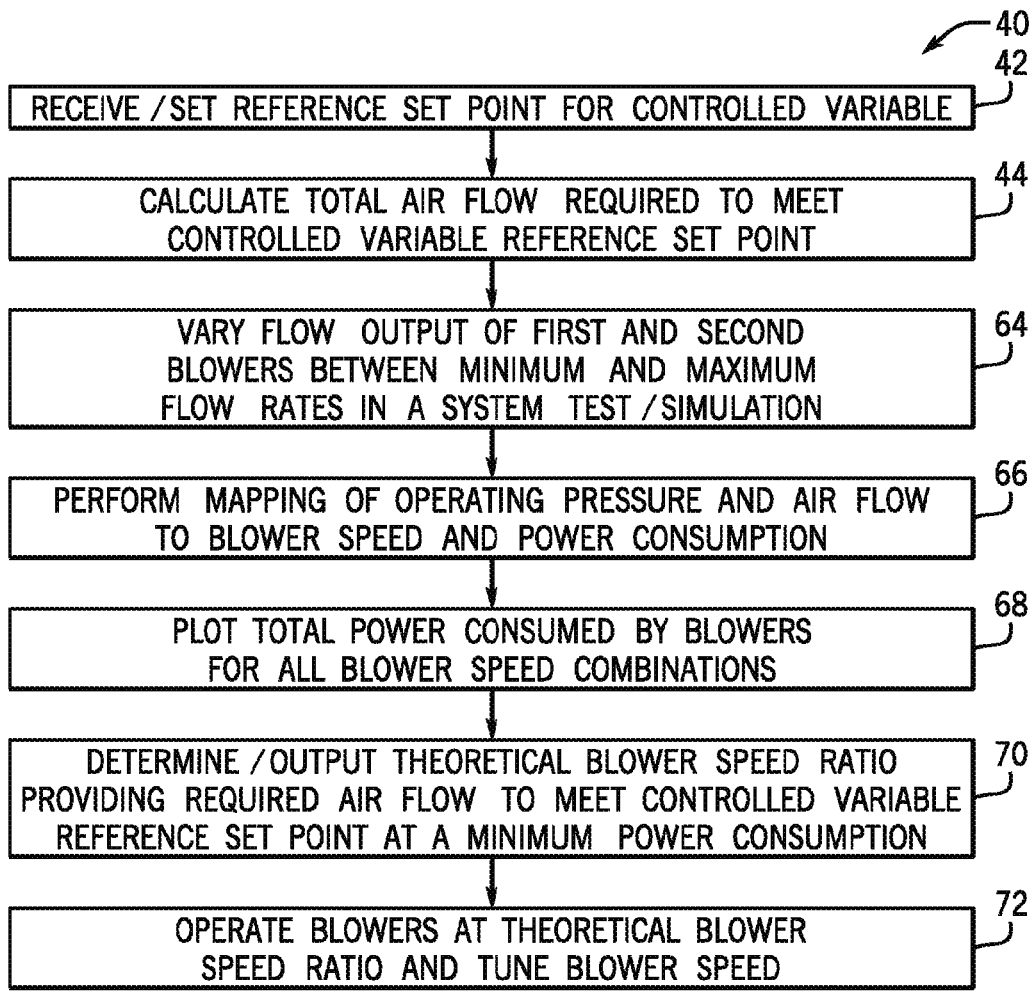
FIG. 2 is a flowchart illustrating an open-loop control scheme for the ventilation system of FIG. 1 according to an embodiment of the invention.

Referring now to FIG. 2, and with continued reference to FIG. 1, a technique 40 for controlling the output flow and power consumption of blower 14 and blower 16 is shown according to an embodiment of the invention, with the technique 40 being an open-loop control scheme. In practice, the open-loop control scheme shown in FIG. 2 is performed by way of a simulation (either independently by controller 28 or via a high speed computer in communication with controller 28) in order to identify operational characteristics of the ventilation system 10. According to embodiments of the invention, the technique 40 is implemented and performed by a device having suitable processing capabilities, such as a properly configured processor or controller. In one embodiment, the controller 28 associated with motor drive 24 is programmed to perform technique 40 for controlling of the blowers 14, 16 in ventilation system 10.

The technique 40 begins at STEP 42 with the receiving of a value for a set point (i.e., reference set point) for a controlled variable that is controllable by operation of the first and second blowers 14, 16—with the operation of the first and second blowers 14, 16 being controlled to achieve the reference set point. Examples of the controlled variable are a temperature or pressure that is controlled in the ventilation system 10, although it is recognized that the controlled variable could be another parameter related to operation of the ventilation system. In one embodiment, the reference set point is manually set by an operator and provided to controller 28 (i.e., received by controller), such that controller 28 accordingly identifies the set point and can control operation of motor drives 24, 26 and blowers 14, 16 to achieve the set point.

In a next step of technique, at STEP 44, a total air flow required from the blowers 14, 16 in order to bring a value of the controlled variable to the reference set point is calculated. The calculation of the total flow required may be determined in one of three ways, depending on the information available regarding operation of the ventilation system 10. The various ways of calculating the total flow required are shown in FIGS. 3-5.

Figure 3:
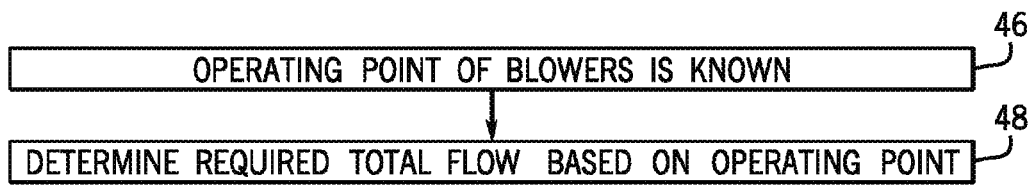
FIG. 3 is a flowchart illustrating a technique for use in the open-loop control scheme of FIG. 2 for determining a total air flow required in the ventilation system to bring a controlled variable to a reference set point according to an embodiment of the invention.

In a first embodiment, and as indicated in FIG. 3, the operating point (i.e., pressure and air flow) of the blowers 14, 16 and the ventilation system 10 is known, as indicated at STEP 46. Thus, based on the known operating point, the total flow required from the blowers 14, 16 is then determined at STEP 48.

Figure 4:
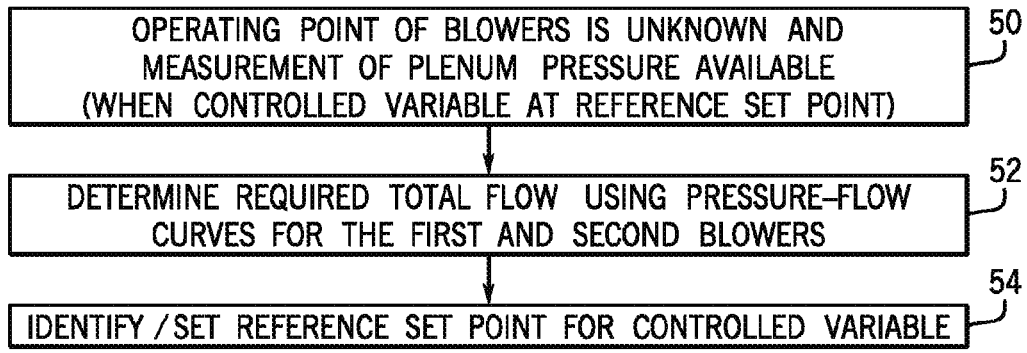
FIG. 4 is a flowchart illustrating a technique for use in the open-loop control scheme of FIG. 2 for determining a total air flow required in the ventilation system to bring a controlled variable to a reference set point according to an embodiment of the invention.

In a second embodiment, and as indicated in FIG. 4, the operating point (i.e., pressure and air flow) of the blowers 14, 16 and the ventilation system 10 is not known, but a measurement of the plenum air pressure is available, with the air pressure being measured/noted when the controlled variable in open-loop is at the reference set point, as indicated at STEP 50. In STEP 50, the ratio of speed between the blowers 14, 16 is set to a default ratio or a predetermined ratio based on experience. The speed of blower 14 is adjusted (speed of blower 16 would follow) till the controlled variable reaches the reference point. As the plenum pressure is known, the total air flow at the measured plenum air pressure for the system 10 can be calculated at STEP 52 by accessing pressure-flow curves for the first and second blowers—such that the total flow required from the blowers 14, 16 is thus known. As the plenum pressure and the total air flow at the measured plenum air pressure are known, the operating point of the system 10 is thus also known, as indicated at STEP 54.

Figure 5:
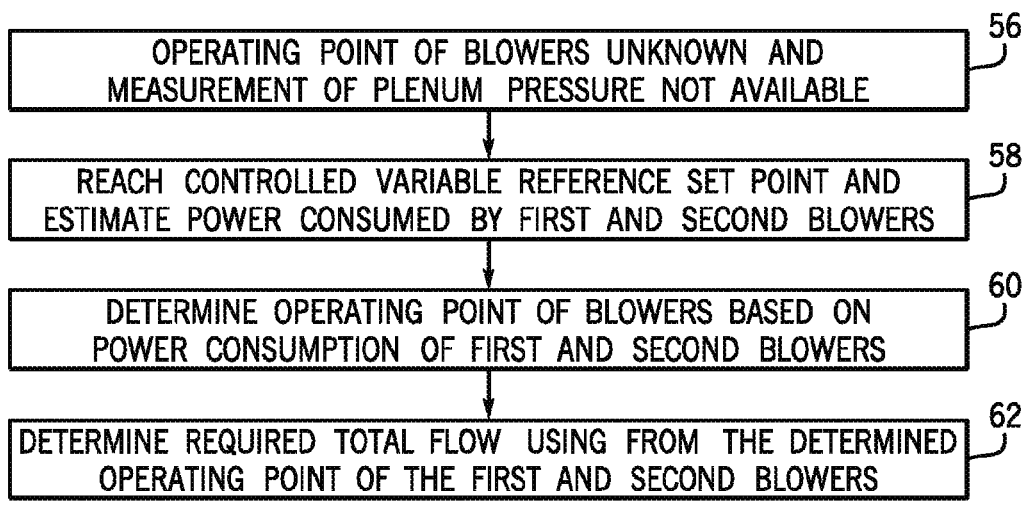
FIG. 5 is a flowchart illustrating a technique for use in the open-loop control scheme of FIG. 2 for determining a total air flow required in the ventilation system to bring a controlled variable to a reference set point according to an embodiment of the invention.

In a third embodiment, and as indicated in FIG. 5, the operating point (i.e., pressure and air flow) of the blowers 14, 16 and the ventilation system 10 is not known, and a measurement of the plenum pressure is not available, as indicated at STEP 56. In this embodiment, in order to determine the total flow required from the blowers 14, 16 to reach the reference set point of the controlled variable, the reference set point of the controlled variable is first reached, with a corresponding power consumed by each of the blowers 14, 16 then being estimated when the controlled variable set point is at the reference set point, as indicated at STEP 58. In STEP 58, the ratio of speed between the blowers 14, 16 is set to a default ratio or a predetermined ratio based on experience. The speed of blower 14 is adjusted (speed of blower 16 would follow) till the controlled variable reaches the reference point. In doing so, motor drives 24, 26 estimate the power consumed by the blowers 14, 16, with drive and motor losses being removed from the total power input to the drives 24, 26. The power consumption of the drives 24, 26 with their estimated speed gives a good estimate of the operating point of the blowers 14, 16, and thus the operating point of the blowers 14, 16 can be determined at STEP 60 from the power consumption of the blowers 14, 16. By getting the operating point of both the blowers 14, 16, the air flow generated by the blowers and the pressure at which the blowers are operating are thus determined at STEP 62, with the flow from each blower being added to get the total flow. Regarding the pressure at which the blowers 14, 16 are operating, it is recognized that the operating pressure of both blowers should be close (based on their parallel connection to plenum)—and the operating pressure of the blowers 14, 16 can thus be used as a cross check.

Figure 6:
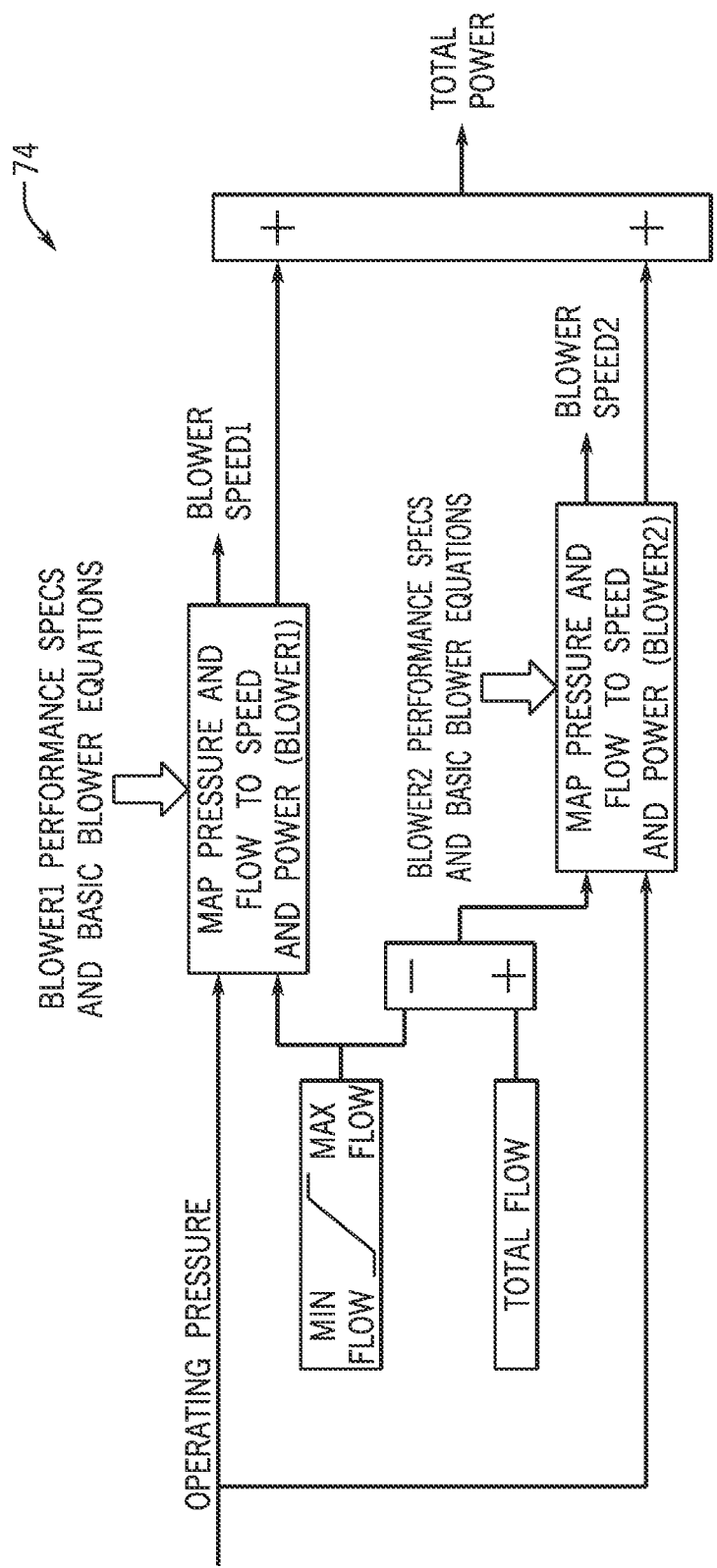
FIG. 6 is block schematic diagram of a static mapping of operating pressure and total flow to total power consumption at various speed combinations for achieving a total air flow required in the ventilation system according to an embodiment of the invention.

Referring again now to FIG. 2, upon calculating the total flow required from the two blowers 14, 16 to reach the controlled variable reference set point, the blower speed ratio at which the blowers would consume minimum energy while giving the same total flow is calculated. The calculation of the blower speed ratio at which the blowers 14, 16 would consume minimum power while providing the required total flow is achieved via a static simulation/static mapping that is described below with respect to STEPS 64-72 of technique 40, and is further shown in the block schematic diagram 74 of FIG. 6. The motor and drive losses of the corresponding blowers 14, 16 can be added to the simulation/mapping to be more accurate. It is to be noted that more emphasis is given on speed ratio, as it is understood in the present invention that an efficient speed ratio would remain efficient over a wider variation in total flow as compared to fixed speed of any individual blower.

Knowing the total required flow necessary to bring the controlled variable to the reference set point, the static mapping is initiated by first varying a flow output of each of the blowers 14, 16 to a plurality of flow levels between a minimum flow and a maximum flow thereof during a system test/simulation, with the flow being divided between the blowers 14, 16 such that the summed flow output of the first and second blowers equals the total air flow required, as indicated at STEP 64. The minimum flow from the blowers 14, 16 at a given pressure is identified from the region of operation of the blowers specified in the performance specifications. The maximum flow from the blowers 14, 16 is identified from the flow corresponding to operating pressure at maximum allowable speed of the blowers (which includes the constraint put by the maximum speed setting of the drives), which is again specified in the blower performance specifications. In varying the flow between the blowers 14, 16, it is recognized that the operating pressure is the same in both blowers, as the blowers in parallel will have the same operating pressure. Further, in case the total flow required from blowers 14, 16 can be met by a single blower, power consumption calculations can be done with the corresponding blower supplying the total flow.

Figure 7:
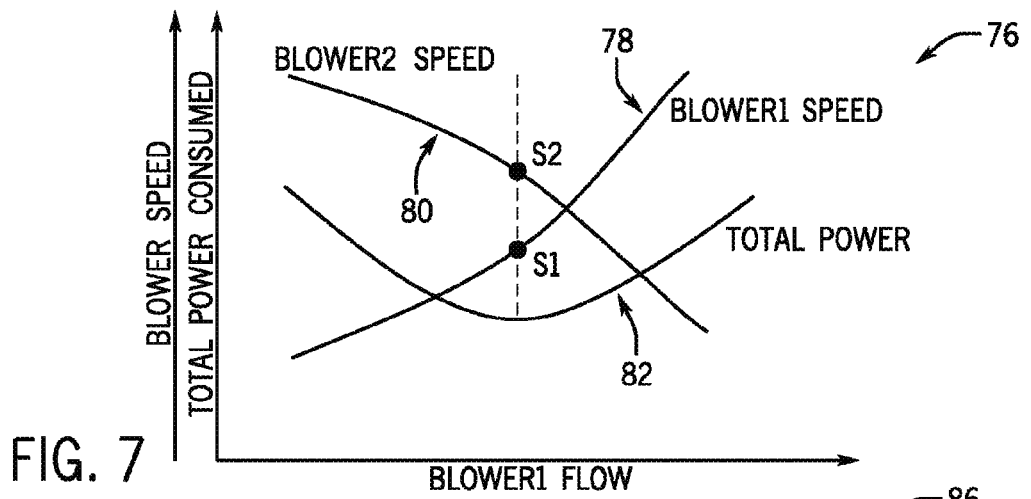
FIG. 7 is a plot of total power consumed by the ventilation system of FIG. 1 for various combinations of blower speeds.

In calculating the blower speed ratio, it is recognized that blower performance specifications and basic blower equations can provide a mapping from operating pressure and air flow from each blower 14, 16 to the speed at which the pressure and flow are achieved, as well as providing information on the power consumed by the blowers at that operating point—and thus the blower performance specifications and basic blower equations are utilized in calculating the blower speed ratio. The motor and drive losses of the corresponding blowers 14, 16 can be added to the simulation/mapping to be more accurate. The motor and drive losses can be calculated at the operating point from the specification and parameters of the motor and drive. Thus, at STEP 66, maps are generated of the operating pressure and flow of the blowers 14, 16 to an associated blower speed and blower power consumption based on the blower performance specifications and blower equations for each of the blowers. From the maps, the total power consumed by the blowers for each combination of blower speeds of the blowers can be plotted at STEP 68. An exemplary plot of the total power consumed by the blowers 14, 16 for each combination of blower speeds is provided in the graph 76 of FIG. 7, in which curves for the speed of the first blower 78, the speed of the second blower 80, and the total power consumed by the system 82 are plotted. From the plot, a combination of blower speeds S1, S2 (i.e., theoretical blower speeds) that provided minimum power consumption while still meeting a required total flow is easily identified. The combination of blower speeds also includes a situation/occurrence where one of the blowers 14, 16 is turned off—i.e., if the total air flow required is less than the max airflow of one of the blowers. It is recognized in the present invention that, in case of identical blowers 14, 16, the speed ratio comes near one over a range of flow requirements. However, as embodiments of the invention are not limited to identical blowers, the speed ratio may not necessarily be one. FIG. 7 gives a view of the plot as envisaged by the inventors and may be different from case to case.

Referring again to FIG. 2, at STEP 70, the theoretical value of a blower speed ratio that provides the required total air flow at a minimum power consumption level is determined. According to one embodiment, this theoretical ratio of the blower speeds that achieves minimum energy consumption is displayed to the operator. Upon calculating the blower speed ratio at which the blowers 14, 16 would consume minimum energy while giving the same total flow, the technique continues at STEP 72 by operating the blowers 14, 16 in ventilation system 10 at the theoretical speed ratio for a controlled variable set point and performing a tuning of the blower speeds, with the motor drives 24, 26 causing to operate the blowers 14, 16 at determined speeds S1, S2, respectively.

According to one embodiment, STEP 72 is performed by shutting off the blowers 14, 16 and restarting them. In doing so, the blower speed ratio references are set as a product of the ratio of the speed of the first blower (S1) to the speed of the second blower (S2) and the belt pulley ratios of the blowers. The blower speed ratio is set in the motor drive 24 (i.e., the "master drive"), and the reference speed of motor drive 24 is slowly (i.e., incrementally) increased until the controlled variable reaches its set point, with a reference speed of motor drive 26 following the increase of the reference speed of the motor drive 24 so as to maintain the calculated blower speed ratio.

According to another embodiment, STEP 72 is performed by automatically adjusting the speed of the blowers 14, 16 based on the theoretical blower speed ratio. An auto adjust can be chosen where the blower speeds move towards theoretical blower speeds S1 and S2 (for blower 1 and blower 2 respectively). When the blower speeds reach the S1 and S2 values, the ratio between them is locked. An operator can then change the reference value of motor drive 24 and tune it to make the controlled variable reach its set point. Ideally, at the theoretical blower speeds S1 and S2 of blower 14 and blower 16, the controlled variable should reach its set point—however, as many noises are not taken into consideration, it is recognized that there could be some gaps.

Figure 8:
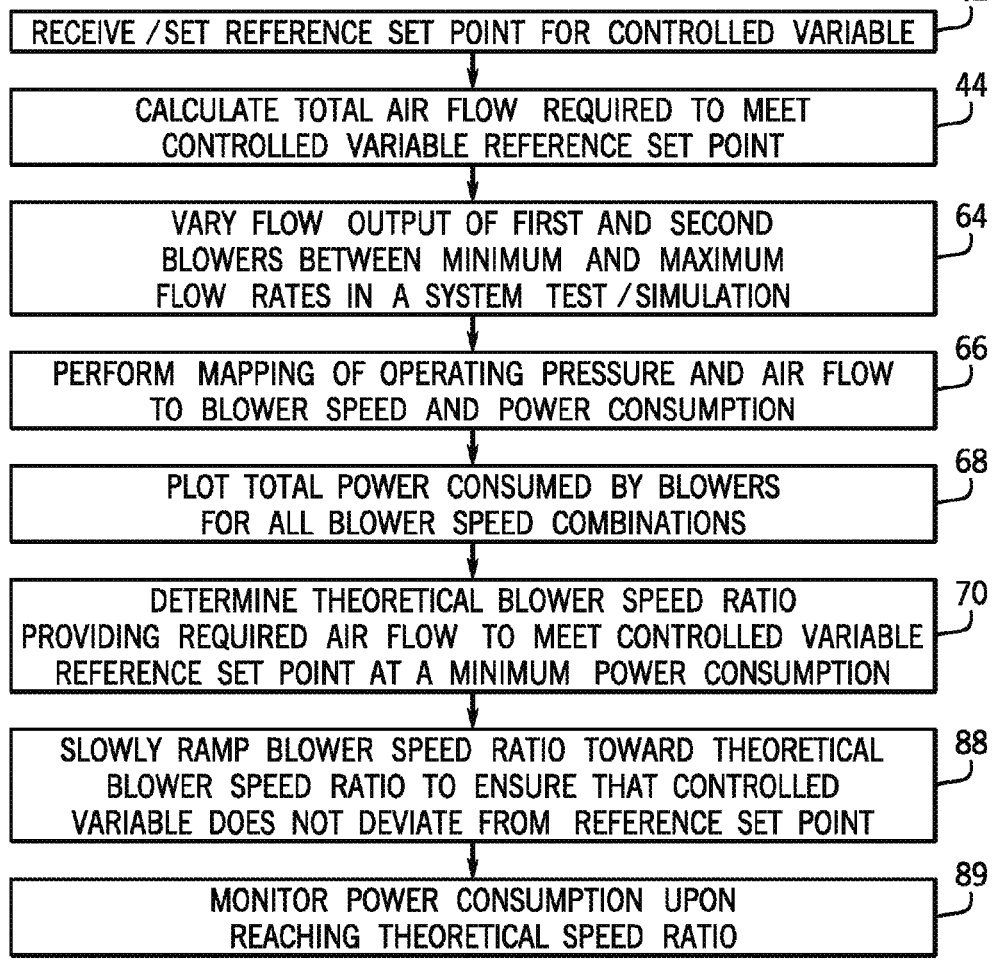
FIGS. 8 and 9 are flowcharts illustrating closed-loop control schemes for the ventilation system of FIG. 1 according to embodiments of the invention.

Referring now to FIG. 8, and with reference back to FIG. 1, a technique 86 for controlling the output flow of blower 14 and blower 16 is shown according to another embodiment of the invention, with the technique 86 being a closed-loop control scheme. The closed loop technique 86 is useful in a ventilation system 10 where variations in operation of the blowers 14, 16 is high, and hence the total flow from the blowers varies significantly. Hence, in a closed loop system, the required total flow from the blowers 14, 16 is calculated/estimated at regular intervals of time depending on the application. The closed loop control technique 86 is similar to the open loop control technique 40 of FIG. 2 to some extent; however, the closed loop control technique 86 has the advantage of continuous monitoring giving better results with varying operating points. The closed loop control techniques also addresses variation in performance with blower age, variations based on location of blowers, and similar noises which are not addressed in open loop controls. In the closed loop technique 86, the two blowers 14, 16 control a variable (temperature, pressure, flow, etc.) in closed loop, with the operator setting the reference set point for the controlled variable, and feedback being provided on the controlled variable (i.e., a dynamic or periodic reading of the value of the controlled variable). The motor drive 24 associated with blower 14 is the "master" drive, with the controller 28 therein achieving the set point of the controlled variable. Motor drive 24 sets the speed reference of motor drive 26 through a communication link.

STEPS 42 and 44 in FIG. 8 are shown with like numbering to STEPS 42 and 44 of the open-loop control technique 40 of FIG. 2, as the performing of these steps in the closed-loop control technique 86 is identical to those performed in the open-loop control scheme. Thus, technique 86 is discussed starting at STEPS 64-70, where the blower speed ratio at which the blowers 14, 16 would consume minimum energy while providing the required flow is calculated. Again, the performing of STEPS 64-70 are shown with like numbering to STEPS 64-70 of the open-loop control technique 40 of FIG. 2, as the performing of these steps in the closed-loop control technique 86 is identical to those performed in the open-loop control scheme. As such, it is noted that the output from the open-loop technique 40 regarding the theoretical speeds of the blowers S1, S2 (and the ratio there between) can be used as a "starting point" for the closed-loop technique 86. However, with respect to the closed-loop control scheme 86 of FIG. 8, it is recognized that the blower speed ratio that would achieve minimum energy consumption is calculated in pre-determined intervals of time based on the fact that the ventilation system 10 experiences greater and more frequent variations. That is, in the closed-loop technique, feedback is received on the controlled variable with respect to the set point and, if it is determined that the total air flow required has increased/decreased, the blower speed ratio between the speeds of the first and second blowers that provides the new required total air flow at a minimum power consumption level is re-calculated.

As shown in STEP 88 of the closed-loop technique, upon calculation of the theoretical speeds of the blowers S1, S2 at STEP 70 (and any required variations of the blower speeds based on feedback received at pre-determined intervals), the blowers 14, 16 are controlled to move towards a determined speed ratio. In doing so, the ratio of speeds is moved towards the calculated blower speed ratio value via very slow ramping so as to ensure that that controlled variable does not deviate from its set point. In varying the blower speed ratio, the total power consumed by the system 10 is also monitored. The movement of the speed ratio towards the calculated blower speed ratio value stops if there is an increase in total power consumption observed as the speed ratio changes. Conversely, if the total power consumption continues to decrease as the speed ratio is moved towards the calculated blower speed ratio value, the speed ratio is further moved till reaching the calculated value. Upon reaching the calculated blower speed ratio value, the power consumption is continued to be monitored at STEP 89. That is, the slope of the change in total power consumed is analyzed and, if the absolute value of slope is high, there is a further change of 10% (or another predetermined value) of the total change in the speed ratio in the same direction to see if a bottom of a power consumption curve is reached (i.e., if power consumption is further minimized)—keeping in mind the minimum and maximum flow/speed limits of the blowers 14, 16. The variation in speed may also include having only one blower active provided it can meet the total airflow required by the system.

Figure 9:
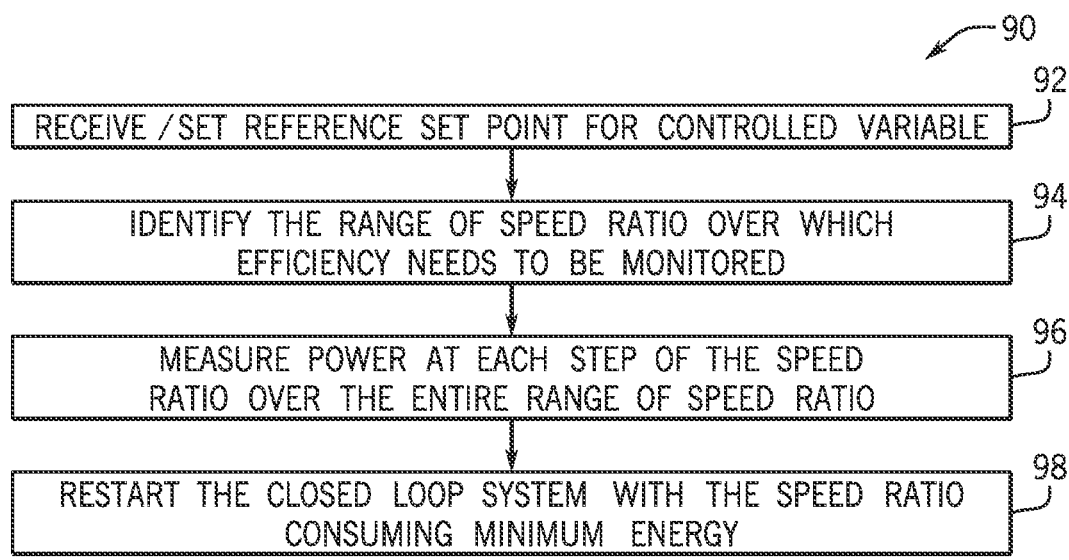

Referring now to FIG. 9, it is recognized that the earlier mentioned closed loop control technique 86 is dependent on the availability of performance specifications of the blower and processing power/memory to perform a simulation (to determine blower speed ratio). However, in some cases this may not be feasible. In such a scenario, the technique 90 in FIG. 9 provides steps to reach the blower speed ratio that provides minimum power consumption in the system 10 for the controlled variable to reach the set reference point. Upon receiving/setting the set reference point at STEP 92, the range of variation in speed ratio over which efficiency needs to be monitored is identified/provided as an input by the user at STEP 94. This may also include having only blower 14 or blower 16 active. Responsive to the provided speed range, the motor drive 24 makes incremental step changes in the step ratio till it covers the whole range of the speed ratio, and the power at each step change is measured at STEP 96 when the system is stable. The speed ratio at which the system consumes minimum energy is identified and displayed to the user. At STEP 98, depending on the user preference, the system can either restart the blowers 14, 16 with the selected speed ratio or transition towards the speed ratio that consumed minimum energy, with the safety of the system 10 being ensured during the transition phase.

Beneficially, embodiments of the invention thus provide a system and method for controlling the output flow of parallel connected blowers 14, 16 to maximize efficiency thereof. The methods implement open and/or closed loop control schemes to determine operational speeds of the parallel connected blowers 14, 16, and a ratio of blower speeds, that meet a required air flow for the system (to achieve a set point for a controlled variable) while minimizing energy consumption of the blowers 14, 16.

While embodiments of the invention have been described above with respect to a technique for controlling the output flow of a pair of parallel connected blowers to maximize efficiency thereof, it is recognized that the control techniques of the present invention can also be implemented for ventilation systems having more than two blowers connected in parallel (i.e., three or more blowers in parallel). Additionally, it is recognized that the control techniques of the present invention can also be implemented for controlling the operation of parallelly connected pumps.

A technical contribution for the disclosed method and apparatus is that it provides for a controller implemented technique for controlling the output flow of parallel connected blowers to maximize efficiency thereof.

According to one embodiment of the present invention, a ventilation system includes a plenum, a first blower connected to the plenum to provide a first air flow thereto via operation of an electric motor of the first blower, and a second blower connected to the plenum to provide a second air flow thereto via operation of an electric motor of the second blower, the second blower being connected to the plenum in parallel with the first blower. The ventilation system further includes a first motor drive configured to control a speed of the electric motor of the first blower so as to also control a speed of the first blower, a second motor drive configured to control a speed of the electric motor of the second blower so as to also control a speed of the second blower, and a controller programmed to receive a set point for a controlled variable that is controllable by operation of the first and second blowers, estimate a total air flow required from the first and second blowers to reach the controlled variable set point, calculate a blower speed ratio between a first blower speed and a second blower speed that provides the required total air flow at a minimum power consumption level, and generate commands to cause the first blower and the second blower to operate at speeds resulting in the calculated blower speed ratio.

According to another embodiment of the present invention, a method for controlling the output flow of parallel connected blowers in a ventilation system includes steps of identifying a set point for a controlled variable in the ventilation system that is controllable by selective operation of a first blower and a second blower in the ventilation system that are connected in parallel to a plenum, estimating a total air flow required from the first and second blowers to reach the controlled variable set point, and calculating a blower speed ratio between speed of the first blower and speed of the second blower that provides the required total air flow at a minimum power consumption level in the ventilation system. The step of calculating the blower speed ratio further comprises steps of accessing blower performance specifications for each of the first blower and the second blower relating blower operating pressure, blower air flow, blower speed and blower power consumption, mapping for each of the first and second blowers operating pressure and air flow levels to an associated blower speed and blower power consumption based on the blower performance specifications, identifying a ratio of blower speeds for the first blower and the second blower that provides the required total air flow at a minimum power consumption level, and operating the first blower and the second blower according to the calculated blower speed ratio, so as to minimize power consumption.

According to yet another embodiment of the present invention, a method for controlling the output flow of parallel connected blowers in a ventilation system includes setting a reference set point for a controlled variable in the ventilation system that is controllable by selective operation of a first blower and a second blower in the ventilation system that are connected in parallel to a plenum, estimating a total air flow required from the first and second blowers to reach the controlled variable reference set point, and calculating a blower speed ratio between a speed of the first blower and a speed of the second blower speed that provides the required total air flow at a minimum power consumption level in the ventilation system. The method also includes operating the first blower and the second blower at speeds resulting in the calculated blower speed ratio, receiving feedback on a value of the controlled variable with respect to the controlled variable at pre-determined intervals, re-calculating the blower speed ratio between the speeds of the first and second blowers that provides a required total air flow at a minimum power consumption level based on the feedback, and incrementally ramping a speed of the first blower based on the re-calculated blower speed ratio, with a speed of the second blower also being incrementally ramped correspondingly to the ramping of the speed of the first blower so as to achieve the re-calculated blower speed ratio, but such that the controlled variable does not deviate from its reference set point.

The present invention has been described in terms of the preferred embodiment, and it is recognized that equivalents, alternatives, and modifications, aside from those expressly stated, are possible and within the scope of the appending claims.

What is claimed is:

1. A ventilation system comprising:
    a plenum;
    a first blower connected to the plenum to provide a first air flow thereto via operation of an electric motor associated with the first blower;
    a second blower connected to the plenum to provide a second air flow thereto via operation of an electric motor associated with the second blower, the second blower being connected to the plenum in parallel with the first blower;
    a first motor drive configured to control a speed of the electric motor associated with the first blower so as to also control a speed of the first blower;
    a second motor drive configured to control a speed of the electric motor associated with the second blower so as to also control a speed of the second blower; and
    a controller programmed to:
        receive a controlled variable set point for a controlled variable that is controllable by operation of the first and second blowers;
        estimate a total air flow required from the first and second blowers to reach the controlled variable set point;
        calculate a blower speed ratio between a first blower speed and a second blower speed that provides the required total air flow at a minimum power consumption level; and
        generate commands to cause the first blower and the second blower to operate at the first blower speed and the second blower speed, respectively, resulting in the calculated blower speed ratio.

2. The ventilation system of claim 1 wherein, in estimating the total air flow required, the controller is further programmed to:
    receive an input regarding a measured air pressure in the plenum when the controlled variable is at its controlled variable set point;
    access pressure-flow curves for the first and second blowers to determine the total air flow at the measured plenum air pressure; and
    determine an operating point of the system from the measured plenum air pressure and the total air flow.

3. The ventilation system of claim 1 wherein, in estimating the total air flow required, the controller is further programmed to:
    receive an input on a power consumed by each of the first blower and the second blower when the controlled variable is at its controlled variable set point;
    determine an operating point of the first blower and the second blower from the power consumption of the first blower and the second blower; and
    estimate the total air flow from the first and second blowers based on the operating point of the first blower and the second blower.

4. The ventilation system of claim 1 wherein, in calculating the blower speed ratio between the first blower speed and the second blower speed that provides the required total air flow at the minimum power consumption level, the controller is further programmed to access blower performance specifications and blower equations for each of the first blower and the second blower, the blower specifications and blower equations providing a mapping of blower operating pressure, blower air flow, blower speed and blower power consumption.

5. The ventilation system of claim 4 wherein the controller is further programmed to:
    vary a flow output of each of the first and second blower to a plurality of flow levels between a minimum flow and a maximum flow thereof such that the summed flow output of the first and second blowers equals the total air flow required;
    generate maps of the operating pressure and the plurality of flow levels of the first and second blowers to an associated blower speed and blower power consumption based on the blower performance specifications and blower equations for each of the first and second blowers;
    plot a total power consumed by the first and second blowers for each combination of first and second blower speeds from the generated maps; and
    based on the plot, identify a blower speed for the first blower and a blower speed for the second blower, and an associated ratio of blower speeds, that provides the required total air flow at a minimum power consumption level.

6. The ventilation system of claim 1 wherein the calculated blower speed ratio comprises a theoretical blower speed ratio; and
    wherein the controller is programmed to control operation of the first blower and the second blower according to an open-loop control scheme, wherein in implementing the open-loop control scheme the controller is programmed to
    control the first and second motor drives to cause the first blower and the second blower to operate at speeds resulting in the theoretical blower speed ratio; and
    tune the speed of the first blower and the second blower from the theoretical blower speed ratio to reach the controlled variable set point.

7. The ventilation system of claim 6 wherein the controller is programmed to:
    shut down each of the first blower and the second blower;
    set the theoretical blower speed ratio in the first motor drive, with a speed of the first blower and a speed of the second blower corresponding to the theoretical blower speed ratio being set in the first motor drive;
    incrementally increase a speed of the first blower until the controlled variable reaches its controlled variable set point, with a speed of the second blower being increased correspondingly to the increase of the speed of the first blower so as to maintain the theoretical blower speed ratio.

8. The ventilation system of claim 6 wherein the controller is further programmed to:

automatically adjust a speed of each of the first blower and the second blower to move towards speeds resulting in the theoretical blower speed ratio;

lock the speeds of the first blower and the second blower upon reaching the theoretical blower speed ratio; and change a reference value of the first motor drive and tune it to make the controlled variable reaches its controlled variable set point.

9. The ventilation system of claim 1 wherein the controller is programmed to control operation of the first blower and the second blower according to a closed-loop control scheme, wherein in implementing the closed-loop control scheme the controller is programmed to:

receive an input regarding the controlled variable set point of the controlled variable; and receive feedback on a value of the controlled variable with respect to the controlled variable set point.

10. The ventilation system of claim 9 wherein the controller is programmed to:

estimate any variation of the total air flow required from the first and second blowers to maintain the controlled variable at the controlled variable set point based on feedback of the value of the controlled variable with respect to the controlled variable set point;

calculate any variation in blower speed ratio between the first blower speed and the second blower speed that provides the variation in total air flow at a minimum power consumption level;

slowly ramp a speed of the first blower based on the calculated variation in blower speed ratio, with a speed of the second blower also being slowly ramped correspondingly to the ramping of the speed of the first blower so as to achieve the calculated variation in blower speed ratio;

wherein the slow ramping of the first blower and the second blower ensures that the controlled variable does not deviate from its controlled variable set point.

11. The ventilation system of claim 9 wherein, in implementing the closed loop control scheme, the controller receives as an initial input the theoretical blower speed ratio between the first blower speed and the second blower speed from the open-loop control scheme.

12. A method for controlling an output flow of parallel connected blowers in a ventilation system, the method comprising:

identifying a controlled variable set point for a controlled variable in the ventilation system, the controlled variable being controllable by selective operation of a first blower and a second blower in the ventilation system that are connected in parallel to a plenum;

estimating a total air flow required from the first and second blowers to reach the controlled variable set point;

calculating a blower speed ratio between a speed of the first blower and a speed of the second blower speed that provides the required total air flow at a minimum power consumption level in the ventilation system, wherein calculating the blower speed ratio further comprises:

accessing blower performance specifications for each of the first blower and the second blower relating blower operating pressure, blower air flow, blower speed and blower power consumption;

mapping, for each of the first and second blowers, operating pressure and air flow levels to an associated blower speed and blower power consumption based on the blower performance specifications;

identifying a ratio of blower speeds for the first blower and the second blower that provides the required total air flow at a minimum power consumption level; and operating the first blower and the second blower according to the calculated blower speed ratio, so as to minimize power consumption.

13. The method of claim 12 wherein estimating the total air flow required comprises:

determining a measured air pressure in the plenum when the controlled variable is at the controlled variable set point;

accessing pressure-flow curves for the first and second blowers to determine the total air flow at the measured plenum air pressure; and determining an operating point of the system from the measured plenum air pressure and the total air flow.

14. The method of claim 12 wherein estimating the total air flow required comprises:

estimating a power consumed by each of the first blower and the second blower when the controlled variable is at the controlled variable set point;

determining an operating point of the first blower and the second blower from the power consumption of the first blower and the second blower; and determining the total air flow from the first and second blowers based on the operating point of the first blower and the second blower.

15. The method of claim 12 wherein mapping operating pressure and air flow levels to an associated blower speed and blower power consumption for the first and second blowers further comprises:

varying a flow output of each of the first and second blower to a plurality of flow levels between a minimum flow and a maximum flow thereof such that the summed flow output of the first and second blowers equals the total air flow required;

mapping the operating pressure and the plurality of flow levels of the first and second blowers to an associated blower speed and blower power consumption based on the blower performance specifications for each of the first and second blowers.

16. The method of claim 15 further comprising generating from the mapping a plot a total power consumed by the first and second blowers for each combination of first and second blower speeds, wherein the identified first and second blower speeds resulting in the calculated blower speed ratio that provides the required total air flow at a minimum power consumption level is based on the generated plot.

17. The method of claim 12 further comprising tuning the speed of the first blower and the second blower from the calculated blower speed ratio to reach the controlled variable set point.

18. The method of claim 17 wherein the speed of the first blower and the speed of the second blower are tuned according to an open-loop control scheme, with the tuning of the speeds of the first and second blowers comprising one of:

shutting down the first and second blowers and subsequently restarting the blowers and incrementally increasing a speed of the first blower until the controlled variable reaches its controlled variable set point, with a speed of the second blower being increased correspondingly to the increase of the speed of the first blower so as to maintain the calculated blower speed ratio; or automatically adjusting a speed of each of the first blower and the second blower to move towards speeds resulting in the calculated blower speed ratio, with the speeds of the first blower and the second blower being locked upon reaching the calculated blower speed ratio.

19. The method of claim 17 wherein the speed of the first blower and the speed of the second blower are tuned according to a closed-loop control scheme, with the tuning of the speeds of the first and second blowers comprising:
receiving an input regarding the controlled variable set point of the controlled variable; and
receiving feedback on a value of the controlled variable with respect to the controlled variable set point;
estimating any variation of the total air flow required from the first and second blowers to maintain the controlled variable at the controlled variable set point based on feedback of the value of the controlled variable with respect to the controlled variable set point;
calculating any variation in blower speed ratio between the first blower speed and the second blower speed that provides the variation in total air flow at a minimum power consumption level; and
slowly ramp a speed of the first blower based on the calculated variation in blower speed ratio, with a speed of the second blower also being slowly ramped correspondingly to the ramping of the speed of the first blower so as to achieve the calculated variation in blower speed ratio, but such that the controlled variable does not deviate from its controlled variable set point.

20. A method for controlling an output flow of parallel connected blowers in a ventilation system, the method comprising:
setting a controlled variable reference set point for a controlled variable in the ventilation system, the controlled variable being controllable by selective operation of a first blower and a second blower in the ventilation system that are connected in parallel to a plenum;
estimating a total air flow required from the first and second blowers to reach the controlled variable reference set point;
calculating a blower speed ratio between a speed of the first blower and a speed of the second blower speed that provides the required total air flow at a minimum power consumption level in the ventilation system;
operating the first blower and the second blower at speeds resulting in the calculated blower speed ratio;
receiving feedback on a value of the controlled variable;
re-calculating the blower speed ratio between the speeds of the first and second blowers that provides a required total air flow at a minimum power consumption level to account for changes in the value of the controlled variable; and
incrementally ramping the speed ratio of the first and second blowers to the re-calculated blower speed ratio, with a speed of the second blower being incrementally ramped correspondingly to a ramping of the speed of the first blower so as to achieve the re-calculated blower speed ratio, but such that the controlled variable does not deviate from its controlled variable reference set point.

* * * * *